(12) United States Patent
Sakamoto et al.

(10) Patent No.: US 7,245,837 B2
(45) Date of Patent: Jul. 17, 2007

(54) OPTICAL TRANSMITTING DEVICE

(75) Inventors: Hisaya Sakamoto, Kawasaki (JP);
Toru Yamazaki, Kawasaki (JP);
Rumiko Tashiro, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 578 days.

(21) Appl. No.: 10/368,346

(22) Filed: Feb. 20, 2003

(65) Prior Publication Data
US 2004/0033082 A1 Feb. 19, 2004

(30) Foreign Application Priority Data
Aug. 15, 2002 (JP) .............................. 2002-236941

(51) Int. Cl.
H04B 10/12 (2006.01)

(52) U.S. Cl. .................. 398/193; 398/188; 398/199

(58) Field of Classification Search .................. 398/95, 398/192–199, 187, 188
See application file for complete search history.

(56) References Cited

U.S. PATENT DOCUMENTS

| 5,691,989 | A | * | 11/1997 | Rakuljic et al. | ............... | 372/20 |
| 5,894,362 | A | * | 4/1999 | Onaka et al. | ................ | 398/95 |
| 6,229,631 | B1 | | 5/2001 | Sato et al. | | |
| 6,590,686 | B1 | * | 7/2003 | Sekiya et al. | ............... | 398/183 |
| 6,661,974 | B1 | * | 12/2003 | Akiyama et al. | ............. | 398/95 |
| 6,757,499 | B1 | * | 6/2004 | Aoki | ........................... | 398/182 |
| 7,006,769 | B1 | * | 2/2006 | Kawasaki et al. | .......... | 398/158 |

FOREIGN PATENT DOCUMENTS

| JP | 56-150723 | 11/1981 |
|---|---|---|
| JP | 62-216506 | 9/1987 |
| JP | 8-278224 | 10/1996 |
| JP | 9-80363 | 3/1997 |
| JP | 11-8590 | 1/1999 |
| JP | A-11-266200 | 9/1999 |
| JP | 2000-22640 | 1/2000 |
| JP | A-2002-23124 | 1/2002 |
| JP | 2002-214578 | 7/2002 |
| JP | A-2002-261692 | 9/2002 |

OTHER PUBLICATIONS

Japanese Office Action, dated Jul. 25, 2006 along with Notice of Rejection.
Japanese Patent Office Notice of Rejection Grounds, mailed Jan. 30, 2007, and issued in priority Japanese Patent Application No. 2002-236941.

* cited by examiner

Primary Examiner—Dzung Tran
(74) Attorney, Agent, or Firm—Staas & Halsey LLP

(57) ABSTRACT

A demultiplex unit demultiplexes the optical output of a Mach-Zehnder optical modulator and inputs the demultiplexed optical output to a wavelength detection unit. The wavelength detection unit detects the wavelength deviations in the ascending or descending part of the optical signal and inputs the wavelength deviations to a detection unit. The detection unit detects the sign and magnitude of chirping in the magnitude of wavelength deviation and inputs the sign and magnitude of chirping to a driving voltage control unit. The driving voltage control unit compares the detected sign and amount of chirping with the target sign and magnitude of chirping, and a driving voltage generation circuit provides the Mach-Zehnder optical modulator with a suitable driving voltage.

13 Claims, 25 Drawing Sheets

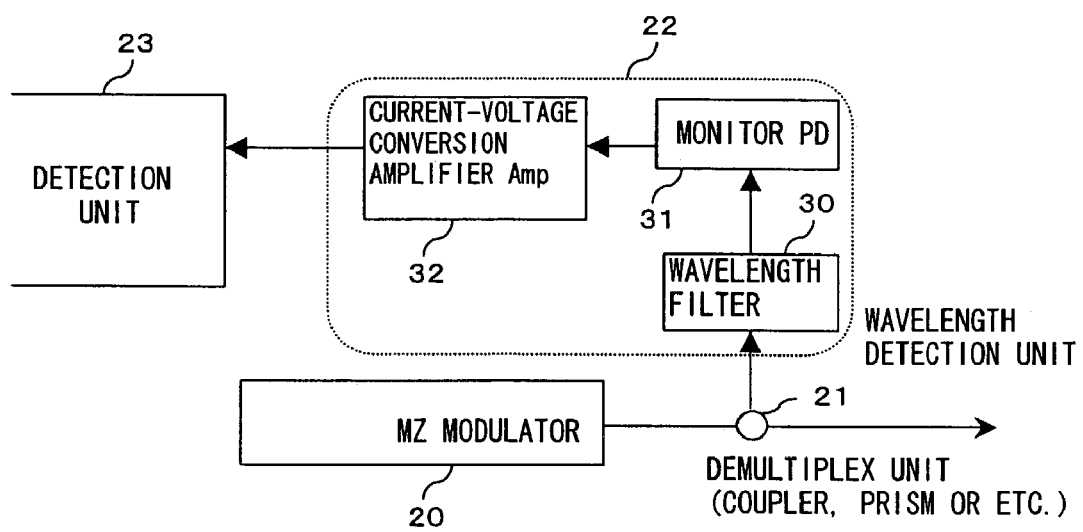
F I G. 8

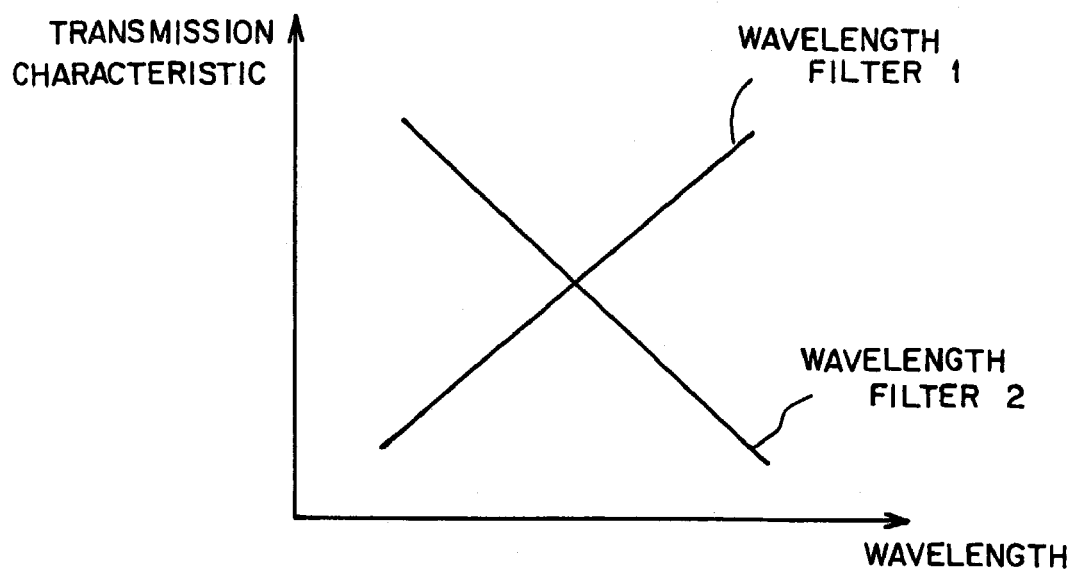
F I G. 12

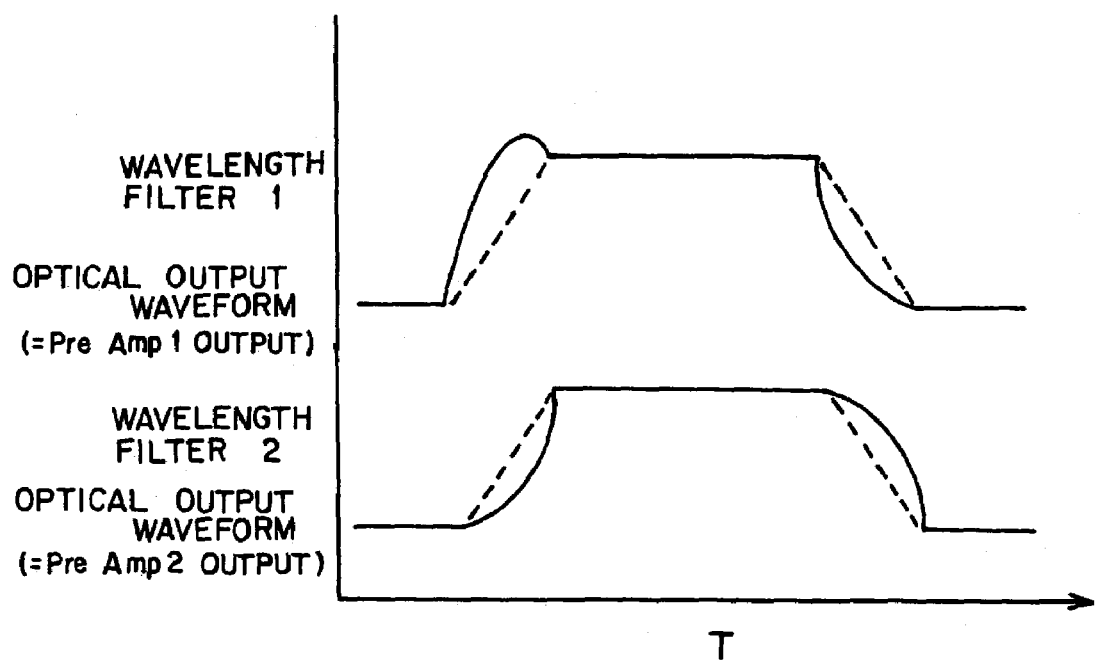
F I G. 13

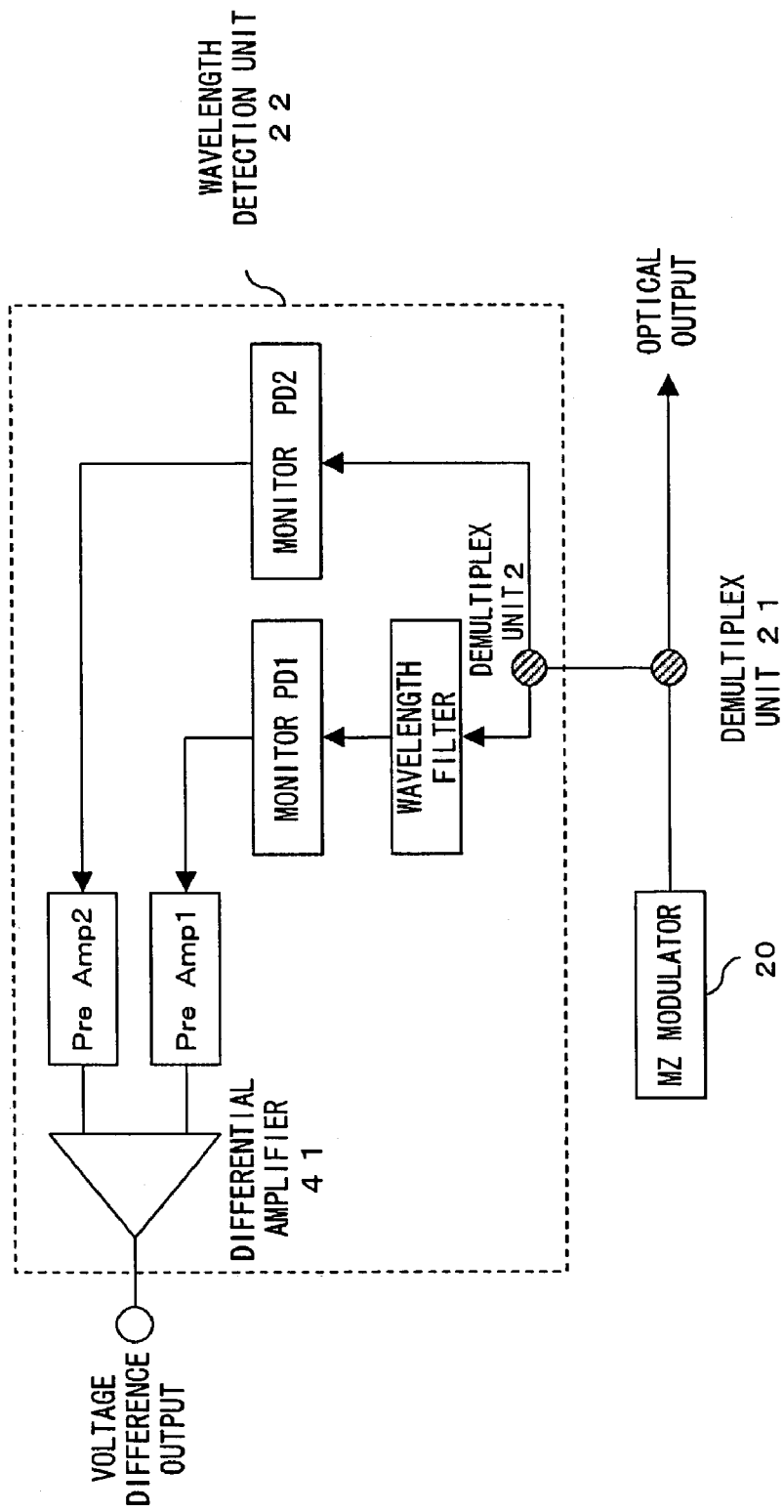
F I G. 15

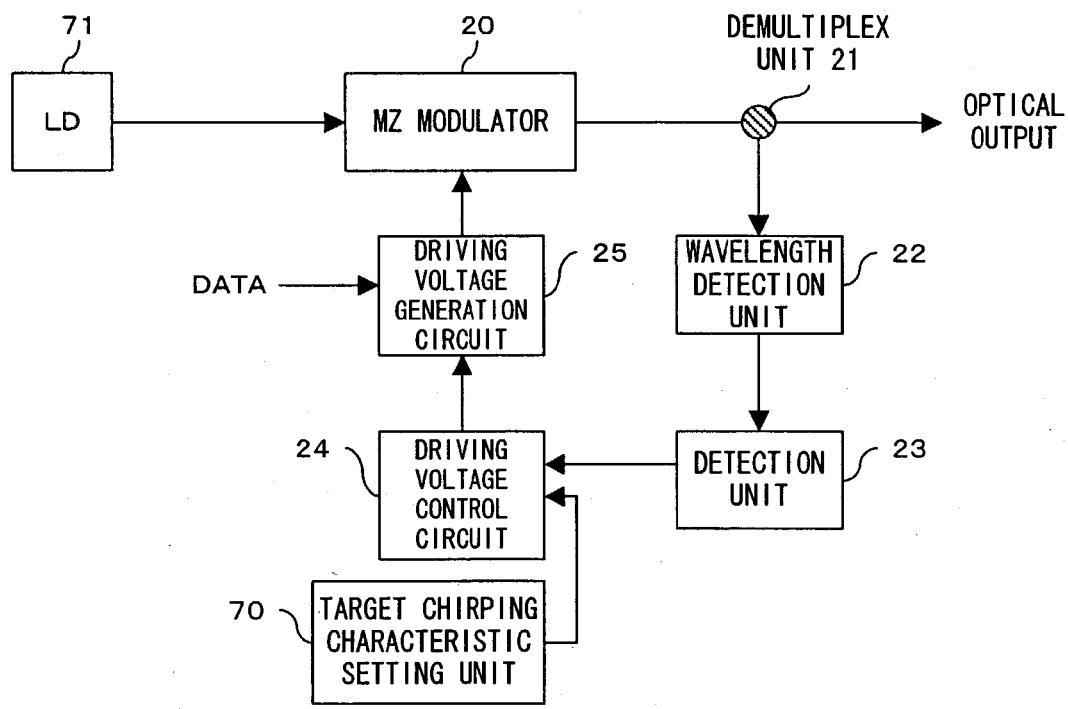
F I G. 2 4

OPTICAL TRANSMITTING DEVICE

BACKGROUND OF THE INVENTION

1. Field of the Invention

The present invention relates to the compensation method for waveform degradation due to wavelength dispersion in an optical transmission system, and in particular, it relates to the wavelength chirping of an optical transmitting device.

2. Description of the Related Art

Since a transmission waveform degrades due to wavelength dispersion in a large-capacity and long-haul optical communication system (optical transmission system with a transfer rate of 10 Gb/s or more), dispersion compensation is indispensable. Regarding the dispersion compensation methods, there are the following three main methods. By optimizing each of the parameters, long-haul transmission is realized.

FIG. 1 shows the outline of a long-haul WDM system and how to compensate for dispersion.

In FIG. 1, first, the electrical/optical (E/O) conversion unit 10 of an optical transmitting unit 10 generates optical signals with a variety of frequencies. For example, E/O1, E/O2, . . . , E/On generate an optical signal with wavelength λ1, an optical signal with wavelength λ2, . . . , and an optical signal with wavelength λn, respectively. An optical multiplexer 11 multiplexes optical signals with respective wavelengths that are generated in this way and inputs the multiplexed optical signal to a transmitting compensation fiber 12 as a wavelength division multiplexing (WDM) signal. Then, an optical transmitting amplifier 13 amplifies the WDM signal and transmits it to a transmission fiber 14. In the receiver, firstly, a receiving amplifier 15 amplifies the WDM signal having been propagated through the transmission fiber 14, a receiving dispersion compensation fiber 16 then compensates for dispersion and an optical demultiplexer 17 demultiplexes the WDM signal into optical signals with respective wavelengths. Then, the respective optical/electrical converters O/E 1 through O/E n of a receiving unit 18 converts each optical signal with its respective wavelength into its respective electrical signal, and the electrical signals are processed.

In the configuration described above, the following methods are adopted as a method for compensating for degradation due to dispersion of an optical signal:

(1) A method for optimizing the wavelength chirping of an optical transmitting unit
(2) A method for inserting a dispersion compensation fiber that negates the amount of wavelength dispersion experienced over a transmission line
(3) A method for increasing optical transmitting power and using self-phase modulation (SPM)

As the means for realizing (1), a configuration using a Mach-Zehnder optical modulator is well known.

FIGS. 2 through 5 show the basic configuration of a Mach-Zehnder optical modulator and its operation.

In the Mach-Zehnder optical modulator shown in FIG. 2, an optical input is demultiplexed into two inputs carried by arms 1 and 2. The respective arms are connected to electrodes 1 and 2, as shown, and voltages V1 and V2 are applied to the electrodes 2 and 1, respectively. In this case, capacitor C1 is inserted between a power source V1 and the electrode 2 and capacitor C2 is inserted between a power source V2 and the electrode 1 to eliminate respective DC biases. When a voltage is applied, the light phase f the input signal changes. Therefore, when an optical input with its original phase is demultiplexed and combined again, the optical input is reproduced with a different phase. This means that if the input optical signal is multiplexed with a different phase, then the output optical signal increases or decreases depending on the magnitude of the phase difference. In this way, optical intensity modulation can be realized.

FIG. 3 shows the relationship between the optical output of the Mach-Zehnder optical modulator and an applied voltage.

As shown in FIG. 3, the intensity of an optical output periodically varies with the change of an applied voltage. Here, the magnitude of an applied voltage is $V_0$, when the optical output obtained is lowest and the magnitude of applied voltage is $V_\pi$, when the optical output is highest. For example, when the voltage of $V_1$ is changed and the voltage of power source $V_2$ is 0 or is grounded, the optical output is lowest if the voltage of the power source $V_1$ is 0 or $V_0$. When the voltage of $V_1$ is $V_\pi$, the optical output is highest. In this case, the optical output changes as shown in (1) of FIG. 3.

However, when $V_1$ is 0 or is grounded and $V_2$ changes, the optical output changes as shown in (2) of FIG. 3. In this case, $V_2$ changes from the lowest to the highest in the range from 0 or V0 to Vπ. However, since the voltage polarity applied to the Mach-Zehnder optical modulator in the case of (1) and that in the case of (2) are opposite, the direction of change of the optical output in the case of (1) and that in the case of (2) are also opposite.

If voltages $V_1$ and $V_2$, each with the same value and opposite polarity, are applied to each of the power sources $V_1$ and $V_2$, respectively, the horizontal axis of FIG. 3 indicates the voltage difference between voltages V1 and V2.

FIG. 4 shows the relationship between the driving voltage amplitude and the optical output of the Mach-Zehnder optical modulator. If the driving voltage amplitude changes in the range from 0 to $V_\pi$, an optical waveform output is obtained, as shown in FIG. 4, due to the relationship between the optical output and the driving voltage of the Mach-Zehnder optical modulator.

The wavelength chirping control method of the Mach-Zehnder optical modulator is realized by applying driving signals $V_1$ and $V_2$ to two branched arms (optical waveguides) and maintaining an amplitude ratio between the two driving signals constant. A specific example of a driving voltage setting method for wavelength chirping is described below. If the Mach-Zehnder optical modulator is driven at a voltage amplitude ratio of 1:0 between respective driving voltages applied to the two driving signals (in other words, a driving signal is input only to one arm), the amount of chirping becomes 1. If the Mach-Zehnder optical modulator is driven while respective voltage amplitudes of the two driving signals are the same, the amount of chirping becomes 0.

FIG. 5 shows the relationship between the driving voltage amplitudes $V_1$ and $V_2$ of the Mach-Zehnder optical modulator, and a chirping coefficient α.

FIG. 5 shows a case where the sum of the respective absolute amplitude voltages of $V_1$ and $V_2$ becomes $V_\pi$.

In FIG. 5, if $V_1$ and $V_2$ are $V_\pi$, and 0, respectively, the chirping coefficient α becomes −1. If $V_1$ is gradually reduced and $V_2$ is gradually increased, the chirping coefficient α gradually increases. When $V_1$ and $V_2$ are 0 and $V_\pi$, respectively, the chirping coefficient α becomes 1.

In this way, in the Mach-Zehnder optical modulator, the chirping coefficient given to an optical signal after modulation varies depending on the voltage applied to each of the two arms.

The chirping coefficient α is generally given according to the following equation:

$$\alpha = (d\phi/dt)(2dP/dt) \quad (1)$$

In the above equation, $\phi$ and P are optical phase and optical intensity, respectively.

FIG. 6 shows an optical output waveform and a wavelength time response characteristic corresponding to a chirping coefficient.

It is assumed that an optical signal with a waveform shown at the top of FIG. 6 is output from the Mach-Zehnder optical modulator. In this case, in FIG. 6, the chirping coefficient α defined by the above equation is indicated by dotted lines. The chirping coefficient α plays a role when an optical output waveform ascends and when it descends. Specifically, since optical intensity does not change for the duration where the optical intensity of an optical output waveform is constant, the value of the chirping coefficient a becomes 0, as seen from equation (1). Therefore, the chirping coefficient α is not defined over this duration.

If as in FIG. 2, $V_1$ and $V_2$ are $V_\pi$ and 0, respectively, the amount of chirping changes as follows. If an optical output waveform ascends, the optical wavelength is deviated upwardly. If the optical output waveform descends, the wavelength is deviated downwardly. In such a case, the chirping coefficient α is positive. In FIG. 6, for such a case as this, α=+1. If each of $V_1$ and $V_2$ is $V_{\pi/2}$, there is no deviation of an optical wavelength even when the optical output waveform ascends or descends, and the chirping coefficient α becomes 0. If $V_1$ and $V_2$ are 0 and $V_\pi$, respectively, the chirping coefficient α becomes −1. In such a case, the optical wavelength deviates downwardly when the optical output waveform ascends, and it deviates upwardly when the optical output waveform descends.

Although in equation (1), it seems to be the amount of change of a phase that is most important, in reality, it is in fact the time taken for a change of a phase to occur that is important. Therefore, the influence of chirping is observed as a wavelength deviation. Specifically, if light is expressed as follows, $$P \propto \cos^2(\omega t + \phi) \quad (2)$$

Frequency is defined as the time differential of a phase as follows.

Frequency=$\omega + d\phi/dt$ (strictly, an angular frequency is described) (3)

If the wavelength of light, the speed of light and the refractive index of a medium propagated by light are λ, c and n, respectively, the following equation holds true.

$$\omega\lambda = 2\pi c/n \quad (4)$$

Then, $$\lambda = 2\pi c/(n\omega) \quad (5)$$

If this ω is substituted into equation (3), the following equation is obtained.

$$\lambda = 2\pi c/(n(\omega + d\phi/dt)) \quad (6)$$

This indicates that the time deviation of a phase is observed as a wavelength deviation.

In a long-haul WDM system, the amount of transmission line wavelength dispersion varies depending on the wavelength. Therefore, the optimum settings value of the chirping coefficient α varies for each wavelength. Accordingly, the ability to allow flexible chirping settings for an optical transmitter is required (for example, the change of α in the range from −1 to +1 must be measured in steps of 0.1).

Since the chirping of an optical transmitter using a Mach-Zehnder optical modulator is set by the ratio between voltages applied to each of the two arms, a method for monitoring driving voltage amplitude is effective. However, the method has the following problems:

(1) If the optical phase modulation efficiency of the driving voltage varies, the prediction of the amount of chirping by the measurement of the driving voltage leads to the occurrence of an error in the chirping coefficient that is wrongly observed as the correct chirping coefficient, due to the fluctuation of the driving voltage in each arm of the Mach-Zehnder optical modulator.

(2) Similarly, there is a difference between a monitored chirping coefficient and an actual chirping coefficient, due to a variety of electrode lengths in each arm of the Mach-Zehnder optical modulator.

(3) There is a high possibility that there are positive and negative chirpings in the vicinity of zero chirping ($V_1=V_2=V_{90/2}$) due to an amplitude detection error, and a transmission waveform degrades.

In the conventional optical transmitter using such a Mach-Zehnder optical modulator, the amplitude of each driving signal must be optimally adjusted in order to optimally control the amount of chirping. However, it is difficult to flexibly set chirping.

SUMMARY OF THE INVENTION

It is an object of the present invention to provide a device for optimally and flexibly setting chirping.

An optical transmitting device according to the present invention comprises an optical modulation unit modulating an input optical signal, based on an input voltage; a first detection unit detecting the change of a wavelength included in the optical output of the optical modulation unit; a second detection unit detecting the amount and sign of chirping that are included in the optical output of the optical modulation unit in the output of the first detection unit; and a control unit controlling the input voltage given to the optical modulation unit, based on the result of the detection by the second detection unit.

According to the present invention, since the sign indicating the polarity (positive/negative) and amount of chirping can be directly detected in the optical output of the optical modulation unit, then the observation error of a chirping state, due to the conventional indefiniteness of an applied voltage or the conventional indefiniteness of an optical response to an applied voltage, can be reduced, and accordingly, chirping can be more accurately controlled.

BRIEF DESCRIPTION OF THE DRAWINGS

FIG. 8 shows the basic configuration of a wavelength detection unit 22;

FIG. 12 shows the first example configuration of a wavelength component extraction unit (No. 2);

FIG. 13 shows the first example configuration of a wavelength component extraction unit (No. 3);

FIG. 15 shows another preferred embodiment of the wavelength detection unit (No. 1);

FIG. 24 shows the configuration of an optical transmitter according to the preferred embodiment of the present invention (No. 1)

DESCRIPTION OF THE PREFERRED EMBODIMENTS

Figure 7:
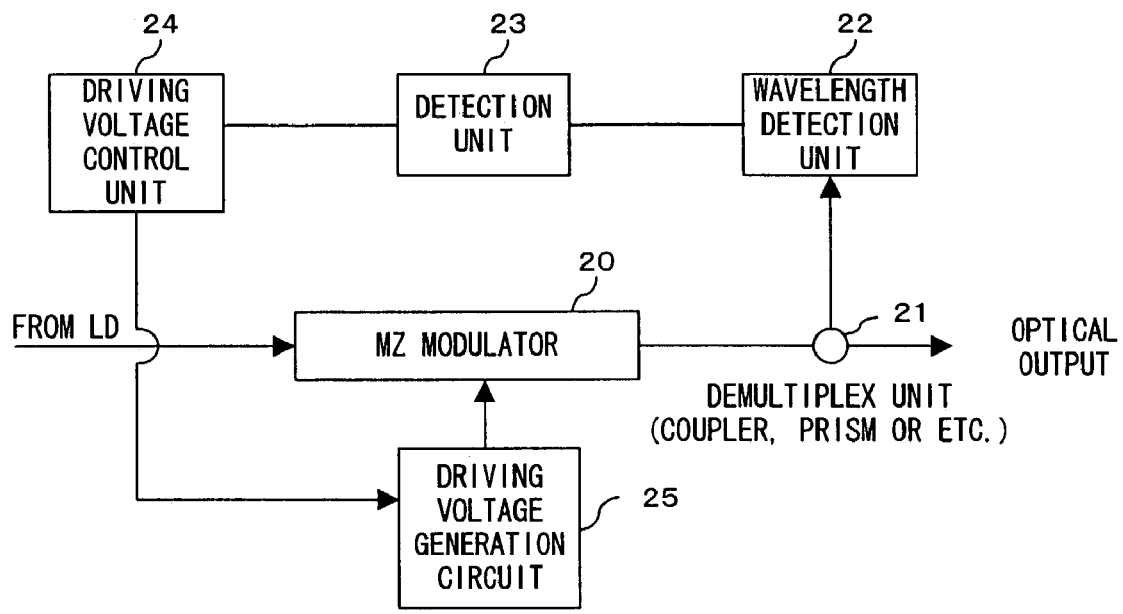
FIG. 7 shows the basic configuration of a device in the preferred embodiment according to the present invention.

FIG. 7 shows the basic configuration of a device in the preferred embodiment according to the present invention.

The Mach-Zehnder driving circuit of the preferred embodiment basically comprises a wavelength detection unit 22 detecting a wavelength in an optical output waveform; a detection unit 23 detecting the amount and sign of chirping in the detected wavelength; a driving voltage control unit 24 controlling the driving voltage of each arm in such a way that chirping reaches a target value; and a driving voltage generation circuit 25.

Figure 6:
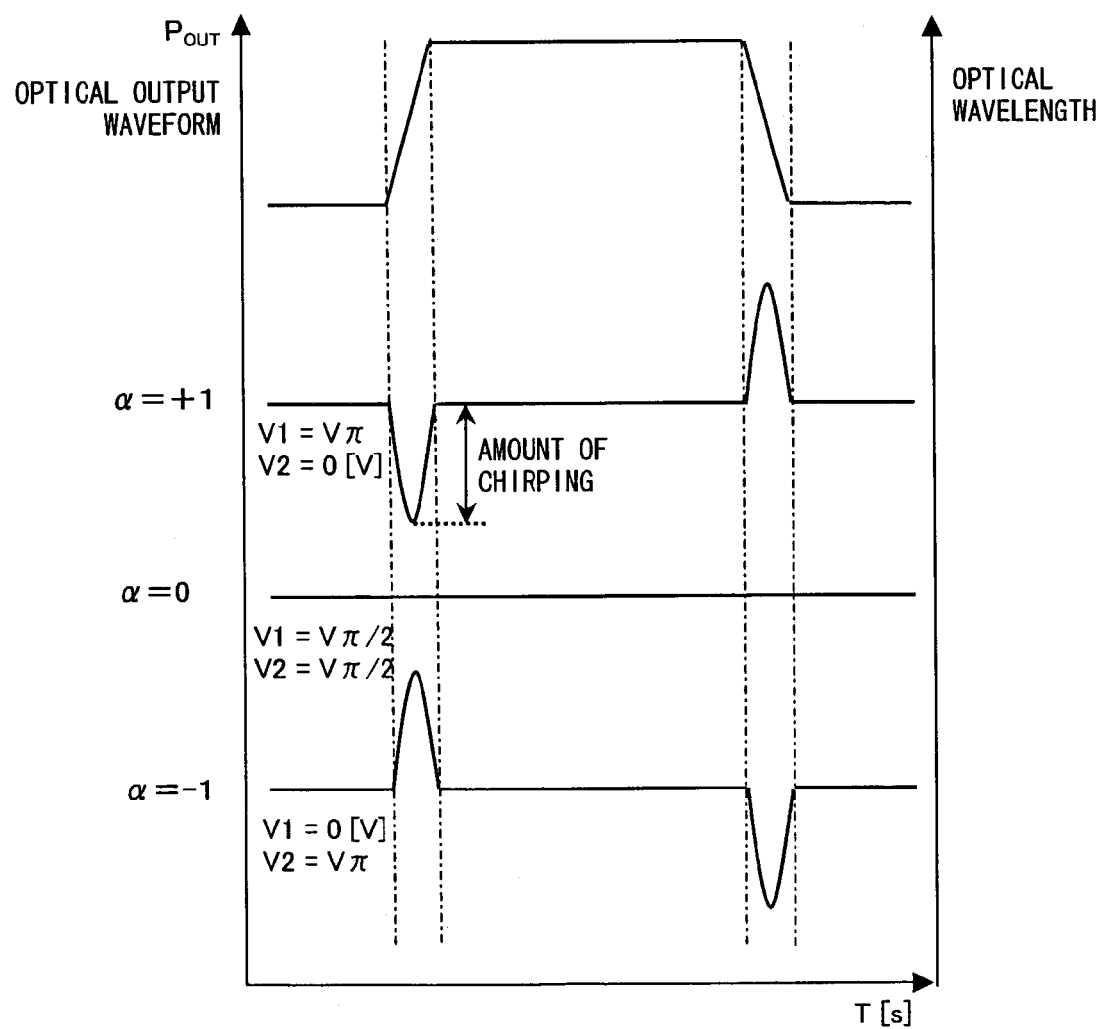
FIG. 6 shows an optical output waveform and the time response characteristic of a wavelength corresponding to a chirping coefficient.

Light emitted from a light emitting diode (LD) is input to a Mach-Zehnder optical modulator 20, is modulated and is transmitted. The optical demodulated signal transmitted from the Mach-Zehnder optical modulator 20 is demultiplexed by a demultiplex unit 21 composed of a coupler, a prism and the like, and is input to the wavelength detection unit 22. The wavelength detection unit 22 detects the deviation of a wavelength as shown in FIG. 6 in the optical output waveform. The detection unit 23 detects the amount and sign of chirping, based on information about the wavelength deviation from the wavelength detection unit 22. The information about chirping is sent to the driving voltage control unit 24, controls the electrode voltage of the Mach-Zehnder optical modulator 20 and optimally sets the amount of chirping.

(1) Wavelength Detection Unit 22

FIG. 8 shows the basic configuration of the wavelength detection unit 22.

As described earlier, the output of the Mach-Zehnder optical modulator 20 is demultiplexed into two outputs. One output is transmitted to a system output and the other is transmitted to the wavelength detection unit 22. The wavelength detection unit 22 further comprises a wavelength filter 30, a monitor PD 31, and a current/voltage conversion amplifier (Amp) 32 (hereinafter called a "pre-amplifier (Pre-Amp)").

Figure 9:
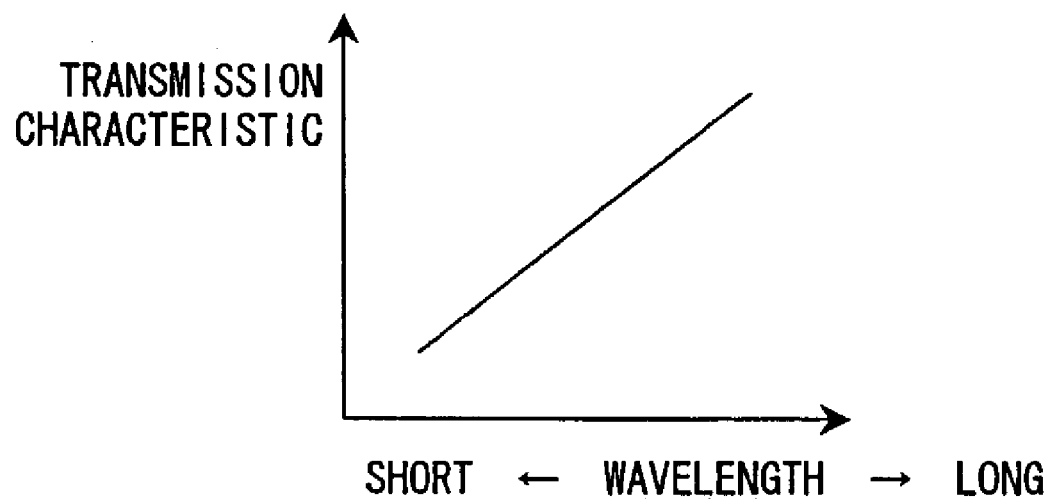
FIG. 9 shows the operation of the wavelength detection unit (No. 1)
Figure 10:
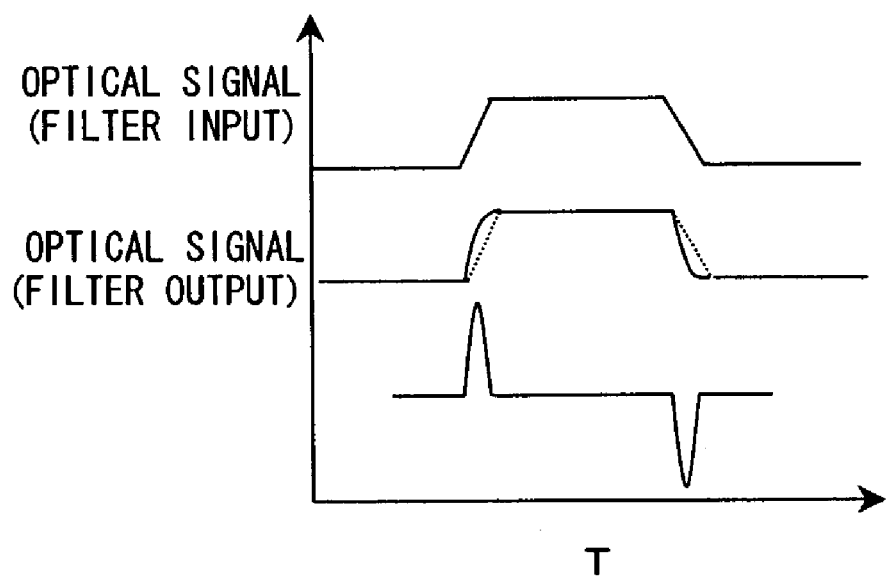
FIG. 10 shows the operation of the wavelength detection unit (No. 2)

The operation of the wavelength detection unit 22 is described below with reference to FIGS. 9 and 10. An optical signal is demultiplexed by the output unit of the Mach-Zehnder optical modulator 20 and passes through a wavelength filter 30 with the wavelength pass characteristic, shown in FIG. 9. If in the case of $\alpha=-1$, an optical signal shown at the top of FIG. 10 is input and passes through the wavelength filter 30, an optical signal shown in the middle of FIG. 10 is obtained. Then, the optical waveforms shown at the top and in the middle of FIG. 10 are input to a monitor PD 31. Next, current, with its corresponding wavelength and intensity is output to the Pre-Amp 32. The Pre-Amp 32 converts the input current into a voltage signal.

In this case, since the output voltage signal of the Pre-Amp 32 includes wavelength and intensity modulation components, a means for extracting only the wavelength component is needed. As for the wavelength component extracting means, there are the following two methods.

FIGS. 11 through 14 show the first example configuration of the wavelength component extracting means.

The wavelength detection unit 22 comprises two sets of a wavelength filter and a PD monitor for optical output. FIG. 12 shows the inclination of the passing characteristic against the wavelength of each of the wavelength filters 1 and 2, and their directions are opposite. Specifically, for the wavelength filters 1 and 2, for example, the inclined part of a band-pass filter with a gentle pass loss inclination against a wavelength, is used.

The respective output current of a monitor PD 1 receiving an optical signal that has passed through the wavelength filter 1 and, of a monitor PD 2 receiving an optical signal that has passed through the wavelength filter 2, shown in FIG. 13, are transmitted to the Pre-Amps 1 and 2, respectively. The respective gains of the Pre-Amps 1 and 2 are set in such a way as to cancel the respective variances of the optical current conversion efficiencies of the monitors PD 1 and 2, respectively. Also by subtracting the output waveform of the Pre-Amp 2 from the output waveform of the Pre-Amp 1, a wavelength voltage signal against an optical output waveform, shown in FIG. 14, can be obtained.

In this case, since the respective characteristics of the wavelength filter 1 and 2 are adjusted in such a way that there is a linear relationship between a wavelength and a pass characteristic, optical intensity to be output varies depending on the wavelength. Therefore, if there is a wavelength deviation in some part of the optical output waveform due to chirping, the optical intensity of that part increases or decreases. In this way, as shown in FIG. 13, there is chirping in the ascending and descending parts of the optical output waveform in the Mach-Zehnder optical modulator, where the ascending and descending parts of the optical output waveform are deformed by the wavelength filters 1 and 2, respectively. Specifically, if the chirp coefficient $\alpha$ is negative, in the wavelength filter 1, the ascending part of an optical output waveform greatly swells and the descending part is dented. In the wavelength filter 2, the ascending part is dented and the descending part greatly swells, since the characteristic of the wavelength filter 2 is the reverse of that of the wavelength filter 1.

Figure 14:
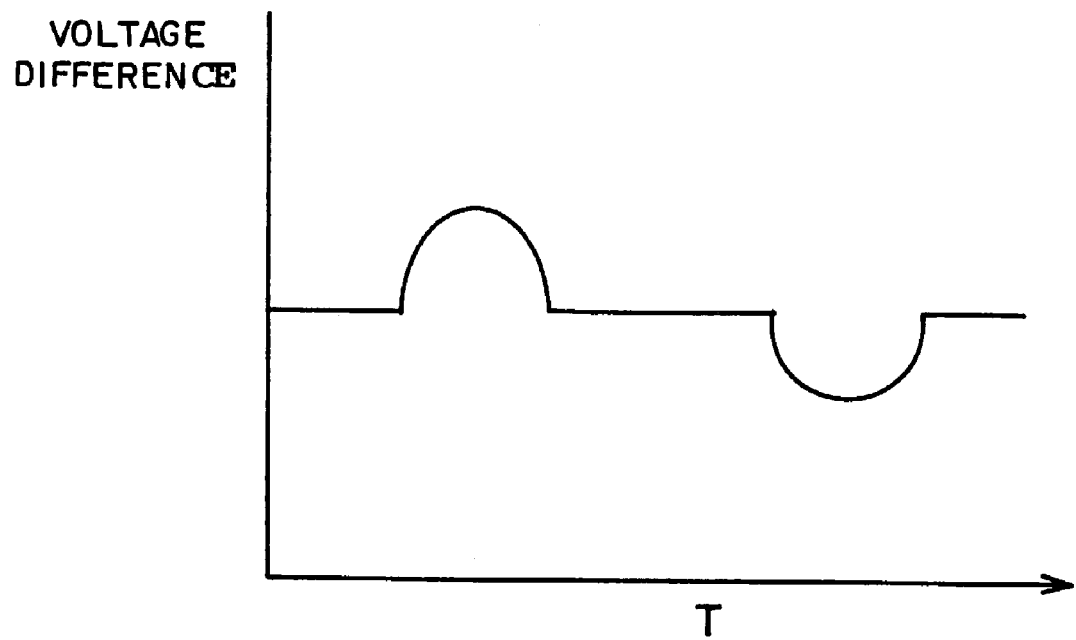
FIG. 14 shows the first example configuration of a wavelength component extraction unit (No. 4)

FIG. 14 shows a waveform obtained by converting these two waveforms into voltages by the respective Pre-Amps and generating a signal by subtracting the output waveform of the Pre-Amp 2 from the output waveform of the Pre-Amp 1 using a differential amplifier 41. In FIG. 14, the wavelength filters 1 and 2 convert only the wavelength deviations into optical intensity. Therefore, the respective heights of the convex and concave parts of the waveform correspond to the amount of chirping.

Figure 16:
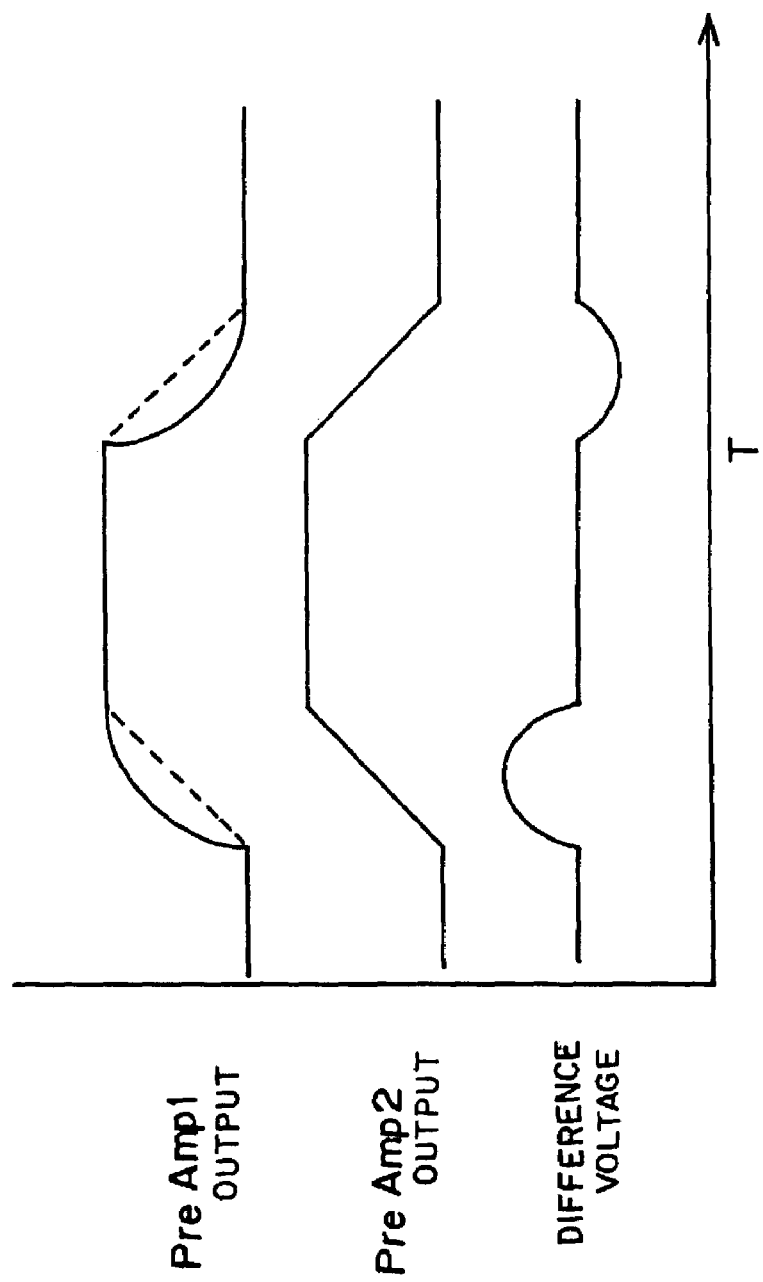
FIG. 16 shows another preferred embodiment of the wavelength detection unit (No. 2)

FIGS. 15 and 16 show another preferred embodiment of the wavelength detection unit.

This wavelength detection unit 22 comprises one set of a wavelength filter and a monitor PD 1 receiving an optical signal that has passed through the wavelength filter, and a monitor PD 2 receiving an optical signal without passing through a wavelength filter. The output currents of the monitor PDs 1 and 2 are transmitted to the Pre-Amps 1 and 2, respectively. The respective gains of the Pre-Amps 1 and 2 are set in such a way as to cancel the respective variances of the optical current conversion efficiencies of the monitor PDs 1 and 2 and to cancel the attenuation of the wavelength filter. By subtracting the output waveform of the Pre-Amp 2 from the output waveform of the Pre-Amp 1, a wavelength voltage signal against the output wavelength can be obtained (FIG. 16).

Figure 11:
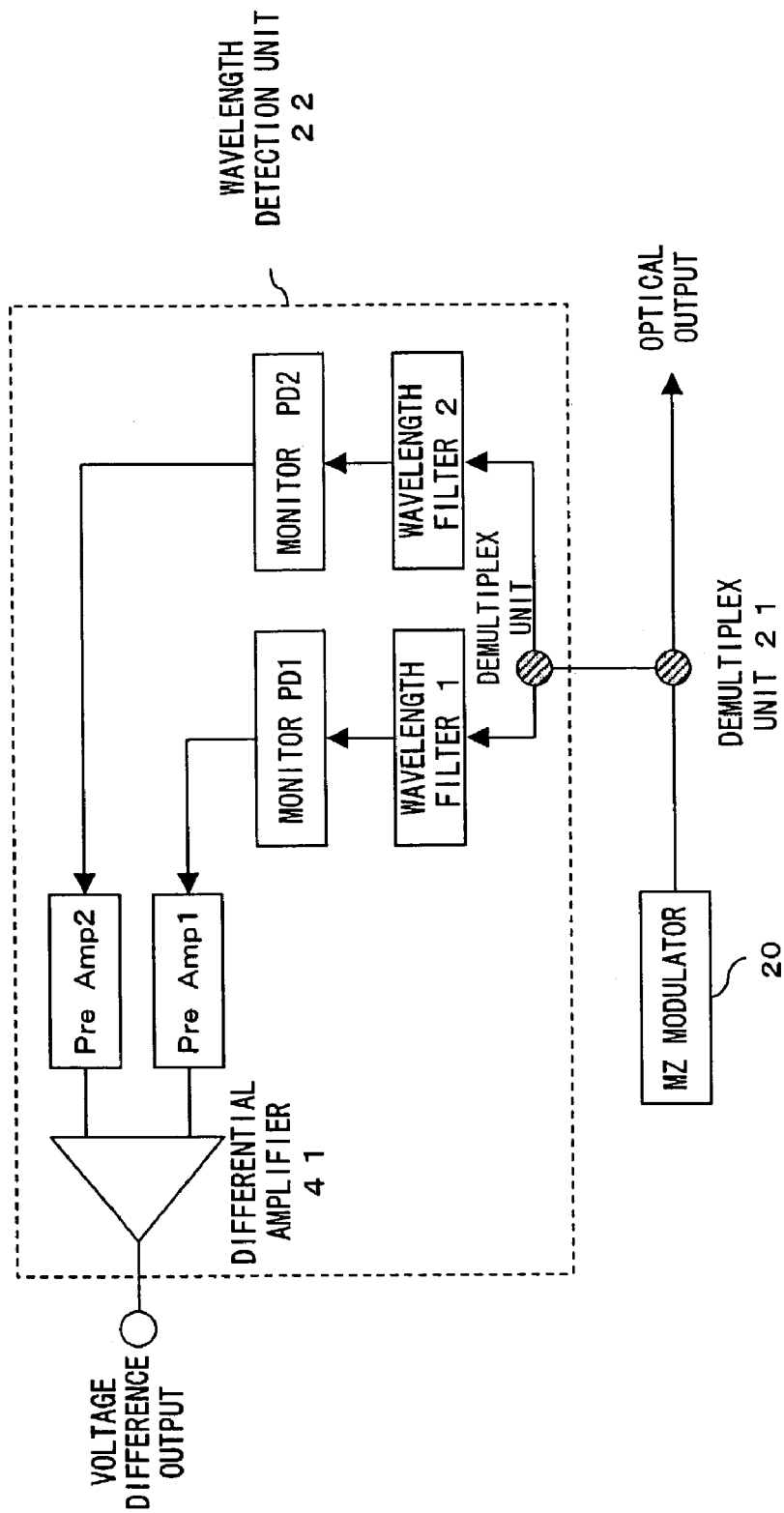
FIG. 11 shows the first example configuration of a wavelength component extraction unit (No. 1)

Although the respective principles of the two preferred embodiments of the wavelength detection unit are the same, high accuracy can be realized by the detection unit shown in FIG. 11. However, the detection unit shown in FIG. 15 can be realized with low cost compared with that shown in FIG. 11.

(2) Means for Detecting Chirping in a Detected Wavelength

Figure 17:
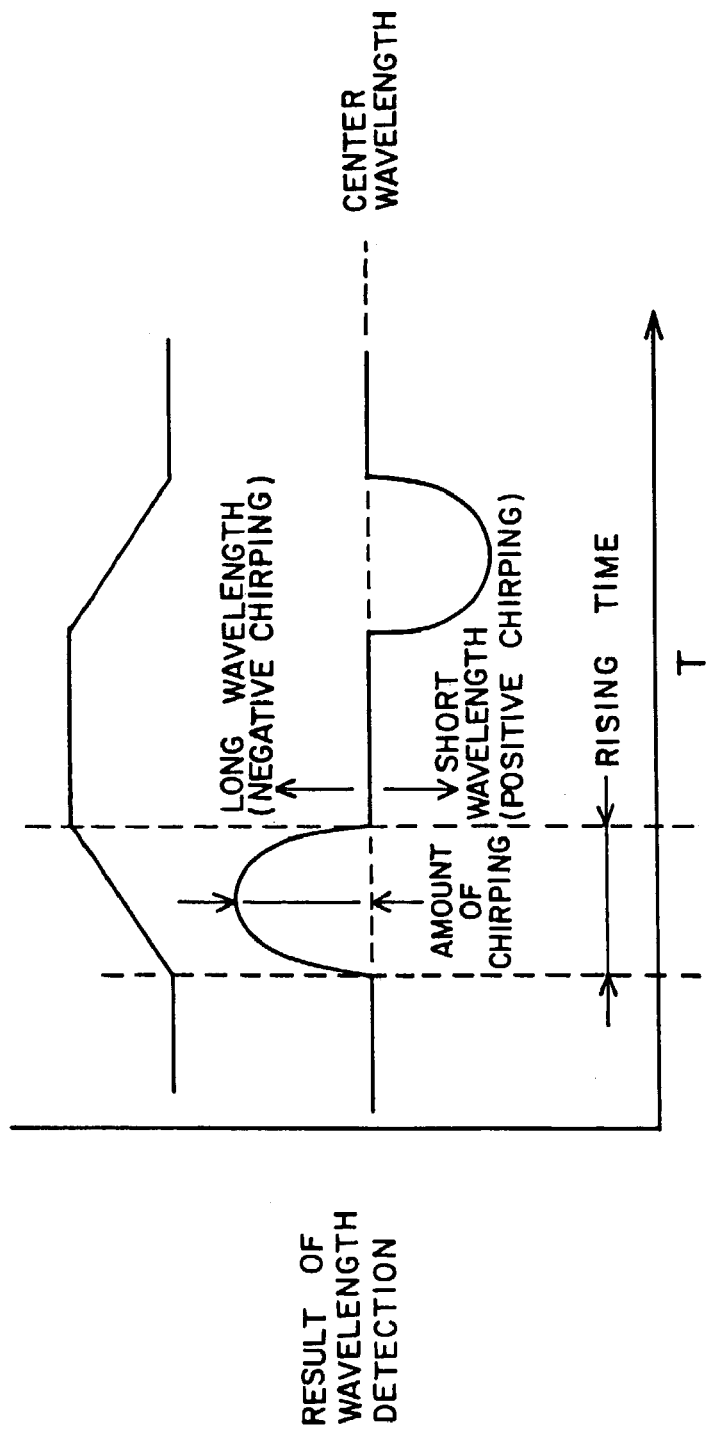
FIG. 17 shows how to detect the amount of chirping.

FIG. 17 shows how to detect the amount of chirping.

As shown in FIG. 17, chirping is expressed by a sign (positive/negative) and a magnitude.

If an optical intensity modulated waveform shifts from a center wavelength toward the long wavelength side during a time of ascent, the sign of chirping becomes negative. If the optical intensity modulated waveform shifts toward the short wavelength side, chirping becomes positive. The magnitude of chirping is the amount of deviation from the center wavelength, at the time of ascent and descent of an optical intensity modulated waveform, and corresponds to the respective magnitudes of the convex and concave parts. As for the means for detecting the parameter described above in a wavelength voltage signal detected by the wavelength detection unit, there are the following.

(a) Detection Unit 23 (The First Configuration)

Figure 18:
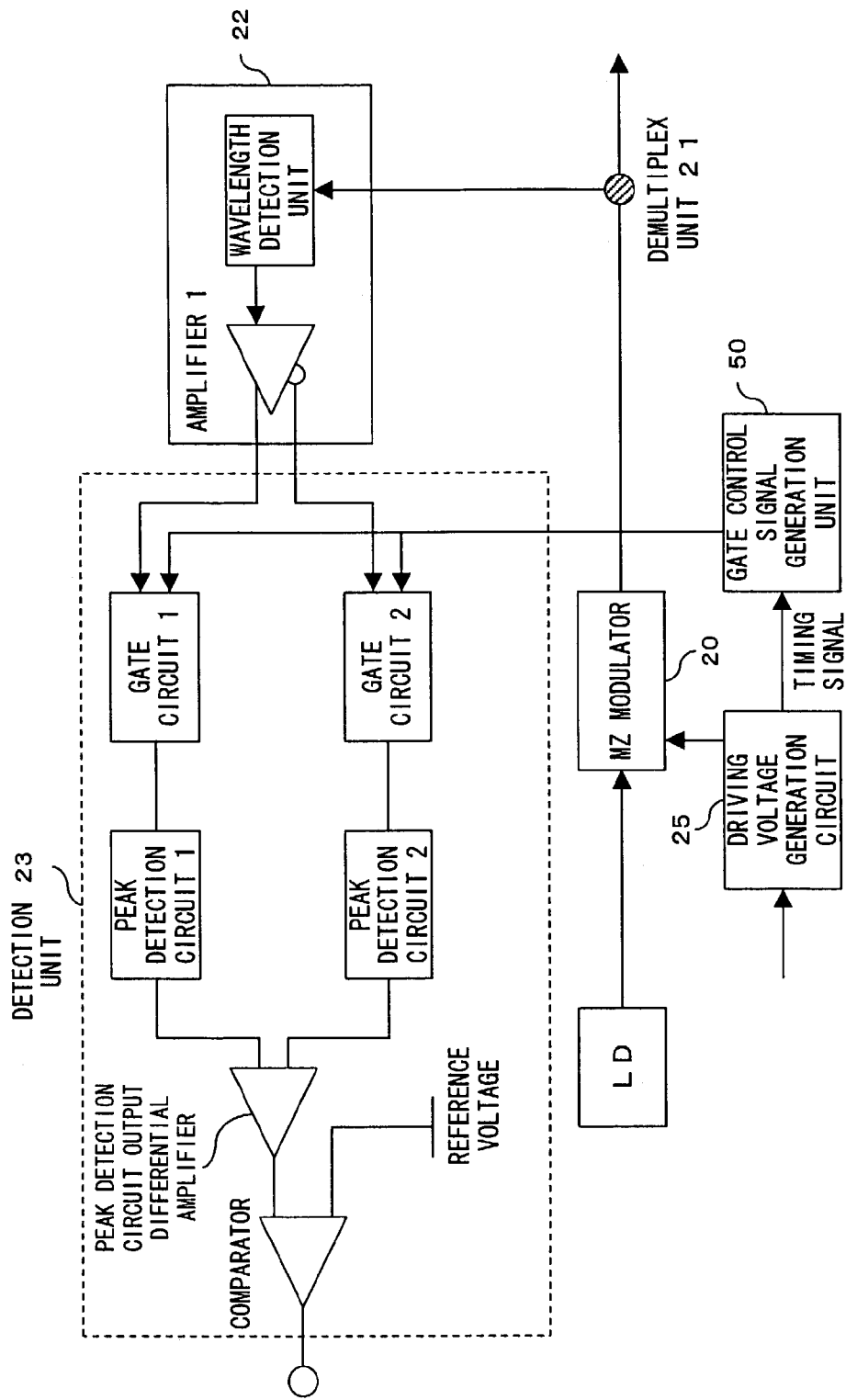
FIG. 18 shows the first example configuration of a detection unit 23 (No. 1)
Figure 19:
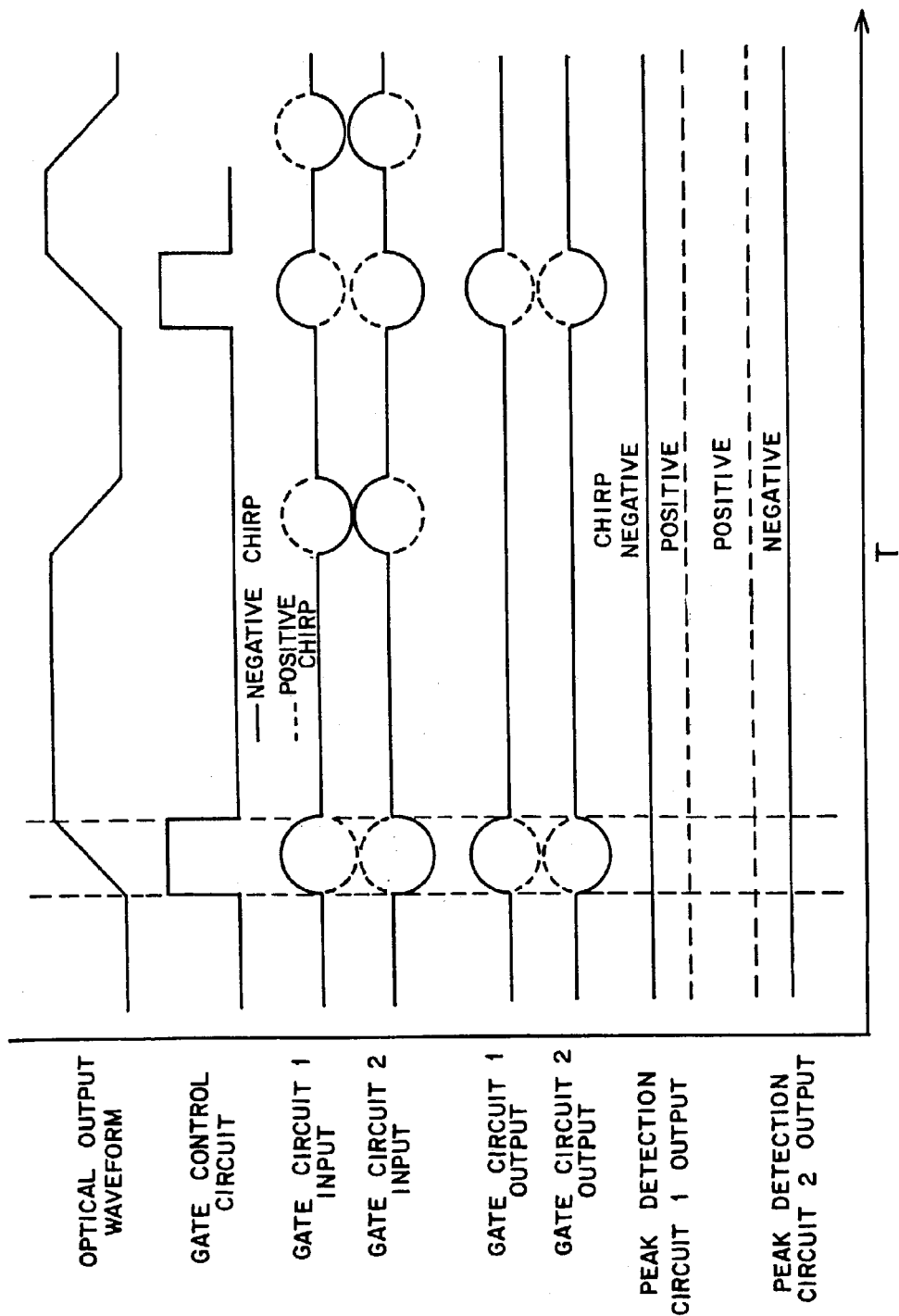
FIG. 19 shows the first example configuration of a detection unit 23 (No. 2)
Figure 20:
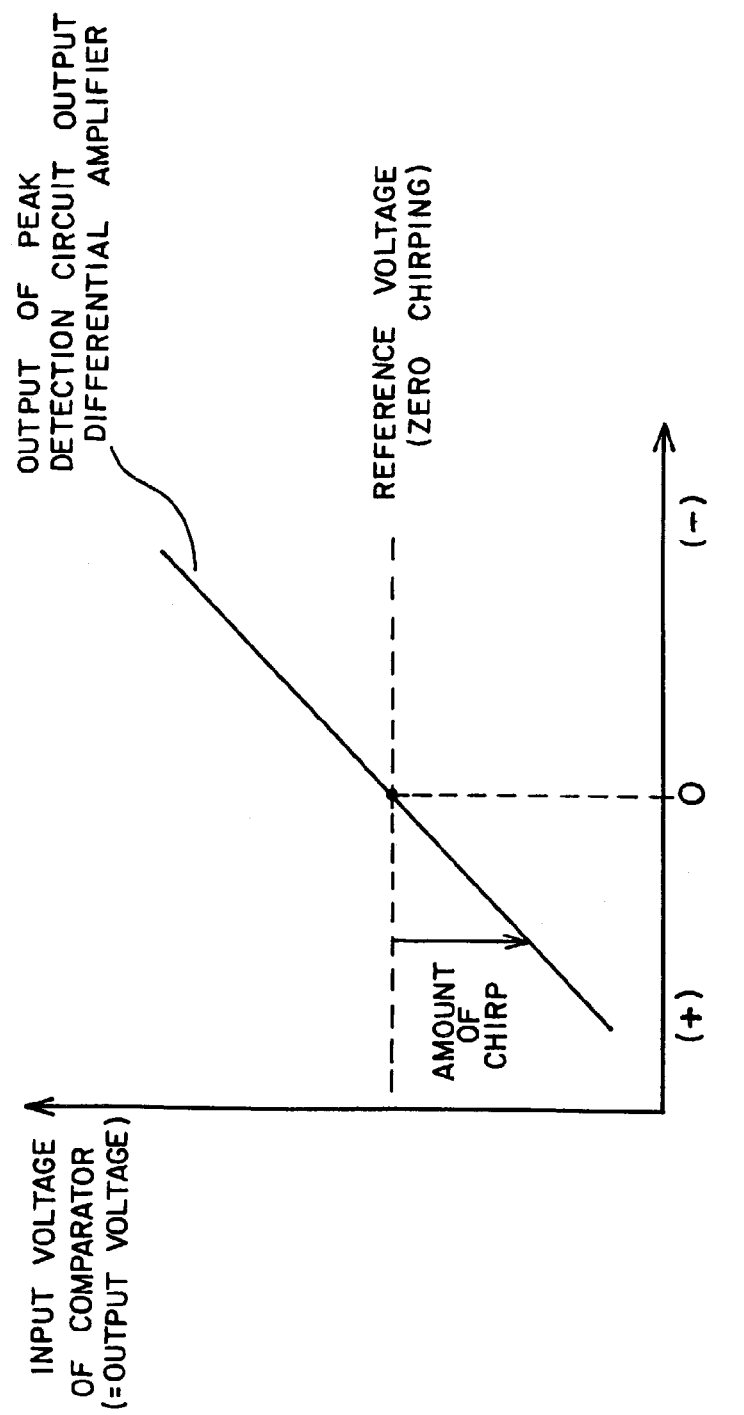
FIG. 20 shows the first example configuration of a detection unit 23 (No. 3)

FIGS. 18 through 20 show the first example configuration of the detection unit 23.

This detection unit 23 detects the shift direction (long or short wavelength side) of a wavelength at the ascending time of an optical modulated signal. The shift direction detection means comprises an amplifier 1 making a differential output of a wavelength detection signal; gate circuits 1 and 2 extracting only the ascending part of the optical output of the conversion/inversion side of the output signal of the amplifier 1 (alternatively only the descending part can also be extracted); and peak detection circuits 1 and 2 detecting the peak output of the respective gate circuits. A gate control signal generation unit 50 receives a timing signal from the driving voltage circuit 25, obtains the ascending time of an optical output and makes the gate circuits 1 and 2 extract only its ascending part. The detection unit 23 calculates the difference in voltage between the peak detection circuits 1 and 2. If the difference voltage is higher than the reference voltage, negative chirping can be detected. If it is lower than the reference voltage, positive chirping can be detected. In this case, for the reference voltage, a voltage obtained when the chirping coefficient is 0 is used (see, FIG. 18).

FIG. 19 is a timing diagram showing the respective timing of all the signals. If an optical output waveform is inputted, it is processed by the wavelength detection unit 22 and is inputted to the detection unit 23. The gate control circuit 50 extracts the time of only, for example, the ascending time of an optical output waveform, and provides it to the gate circuits 1 and 2. The polarities of respective inputs of the gate circuits 1 and 2 are opposite. If the gate circuits 1 and 2 extract only its ascending part, the voltage change in the descending part of the optical output waveform is removed from the respective inputs of the gate circuits 1 and 2. Then, each of the peak detection circuits 1 and 2 stores the maximum or minimum voltage in the ascending part of the optical output waveform and transmits it to a peak detection circuit output differential amplifier. The peak detection circuit output differential amplifier calculates a difference in voltage between the peak detection circuits 1 and 2 and transmits the difference to a comparator. The comparator compares this voltage difference with the reference voltage.

The amount of difference between the output differential voltage and reference voltage of each of the peak detection circuits 1 and 2 is the amount of chirping of each of the peak detection circuits 1 and 2.

FIG. 20 shows the relationship between the output of the peak detection circuit differential amplifier (input voltage to a comparator) and the amount of chirping.

If the output and the reference voltage are the same when the output of the peak detection circuit differential amplifier is compared with the reference voltage, the amount of chirping is judged to be 0. If the output is smaller than the reference voltage, the chirping is judged to be positive. If the output is larger than the reference voltage, the chirping is judged to be negative. If the relationship between the amount of chirping and the input voltage to a comparator is studied, the following fact is found. The smaller the input voltage compared with the reference voltage, the larger the positive amount of chirping. The larger the input voltage compared with the reference voltage, the larger the negative amount of chirping. A person having ordinary skill in the art should appropriately set the value of this reference voltage.

(b) Detection Unit 23 (The Second Configuration)

Figure 21:
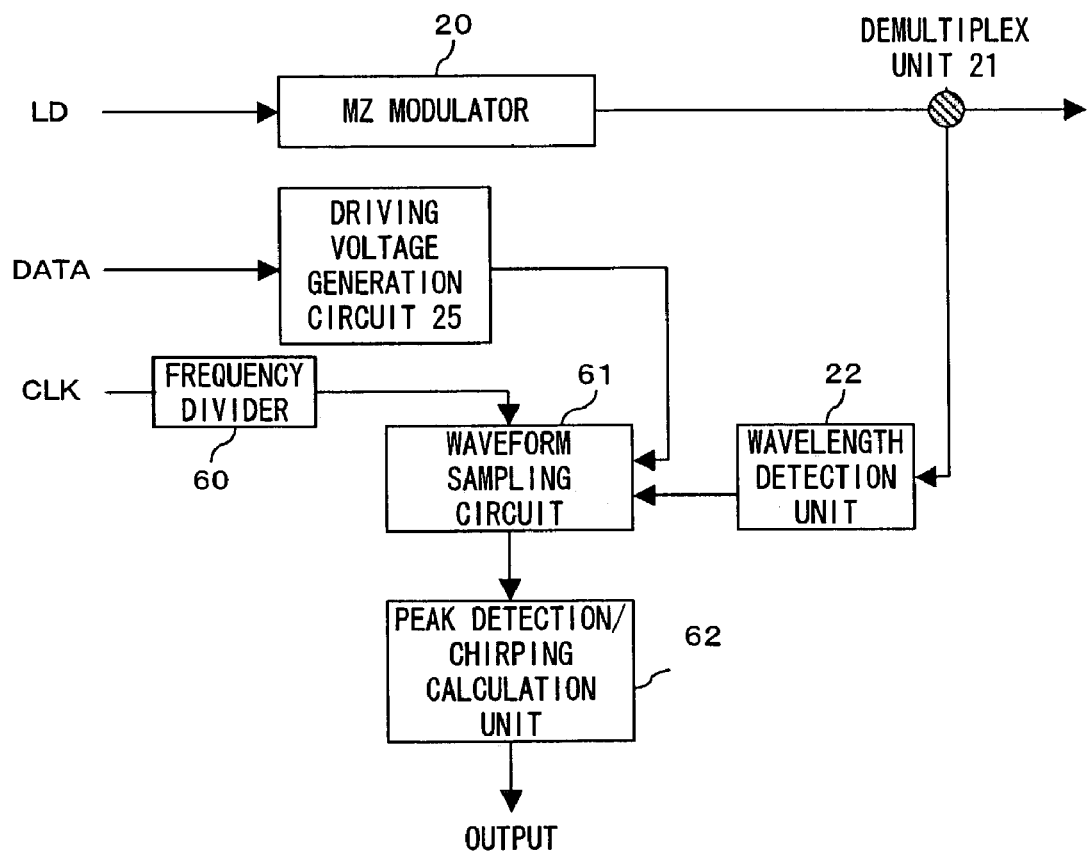
FIG. 21 shows the basic second configuration of the detection unit 23.

FIG. 21 shows the second basic configuration of the detection unit 23.

This detection unit 23 samples the peak value of an optical signal from the wavelength detection unit 22 using a clock obtained by dividing the main signal system clock CLK generating a main optical signal by modulating the optical signal, by a frequency divider 60. The detection unit 23 also samples the peak value of a Mach-Zehnder driving waveform using the sampling rate of the clock. If the peak value of the wavelength detection unit 22 corresponding to the ascending (or descending) part of the peak value of the sampled Mach-Zehnder driving waveform is monitored and the sign of chirping against the reference value (zero chirping) and peak voltage is detected, then the sign and magnitude of chirping can be detected.

In this way, the sign and magnitude of chirping can be digitally processed. The principle of sampling is the same as that of a so-called sampling oscilloscope.

In this way, the sampled peak value is transmitted to a peak value detection/chirping calculation unit 62. The peak value detection/chirping calculation unit 62 calculates the amount of chirping, based on the peak value, and transmits the result to the driving voltage control circuit of the Mach-Zehnder optical modulator.

Figure 22:
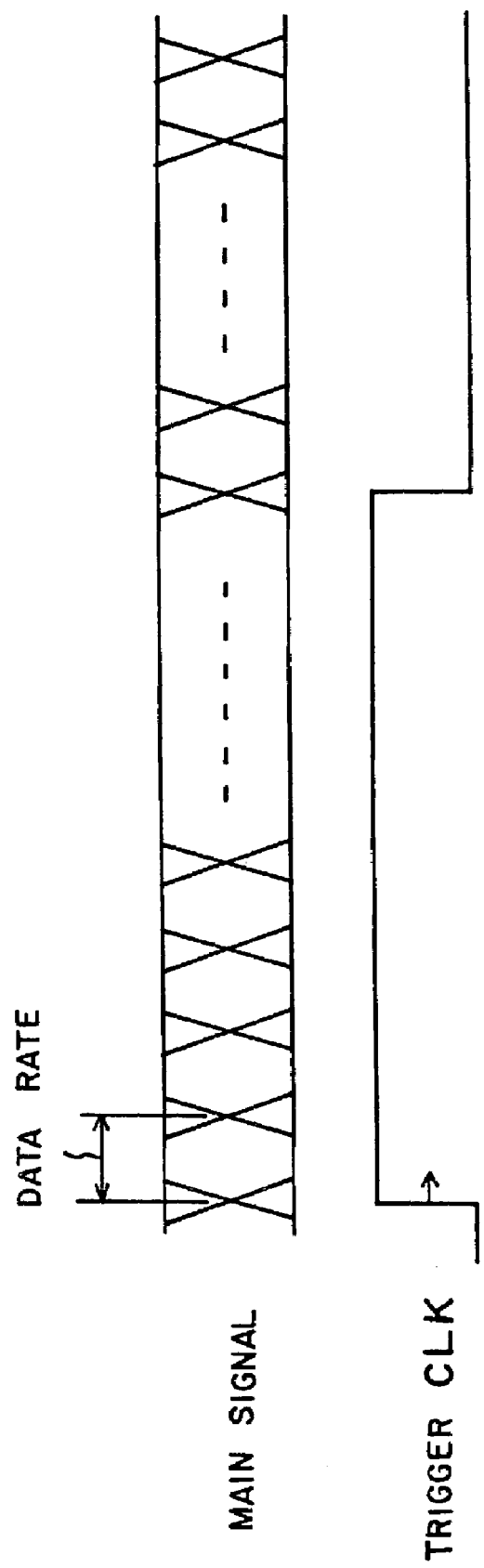
FIG. 22 shows the principle of sampling.

FIG. 22 shows the principle of the sampling.

As described at the top of FIG. 22, the speed of a signal driving the Mach-Zehnder optical modulator is the data rate of a main signal and is close to the highest possible speed of the circuit. In other words, in a large-capacity optical communication system, the data rate of an optical signal to be transmitted is very high, and circuits transmitting/receiving optical signals are designed to operate in accordance with the data rate of this optical signal. In this case, the speed is almost the highest possible for an electrical circuit.

Usually, signals are sampled at a sampling rate higher than the data rate of a signal. However, since the data rate of an optical signal is very high, as described above, the sampling rate cannot be made higher than the data rate. Therefore, the sampling rate is made lower than the data rate and is used as a trigger signal. Peak value sampling is conducted at the ascending time of the trigger signal. Then, by shifting the phase of the trigger signal a little and sampling the peak value of the ascending part of the main signal across a plurality of symbols, the waveform of the ascending part of the main signal can be obtained. Therefore, the obtained waveform is a waveform obtained across a plurality of symbols, instead of a waveform of one symbol.

(3) Means for Controlling a Driving Voltage

Figure 23:
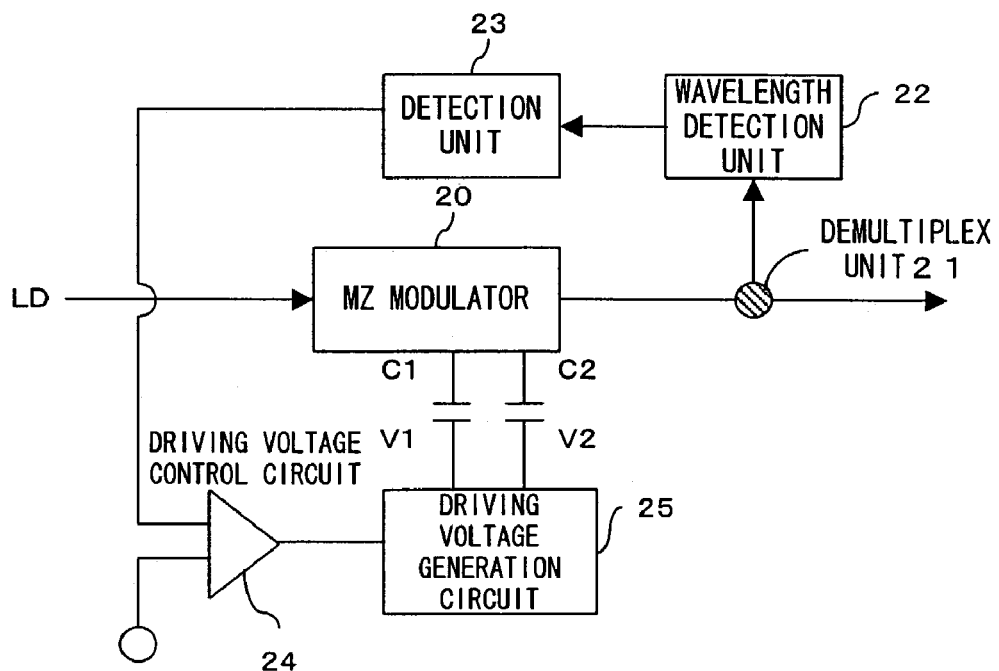
FIG. 23 shows a configuration, including a driving voltage control circuit.

FIG. 23 shows a configuration, including the driving voltage control circuit.

In FIG. 23, the same reference numbers are attached to the same components as described through this document.

Figure 1:
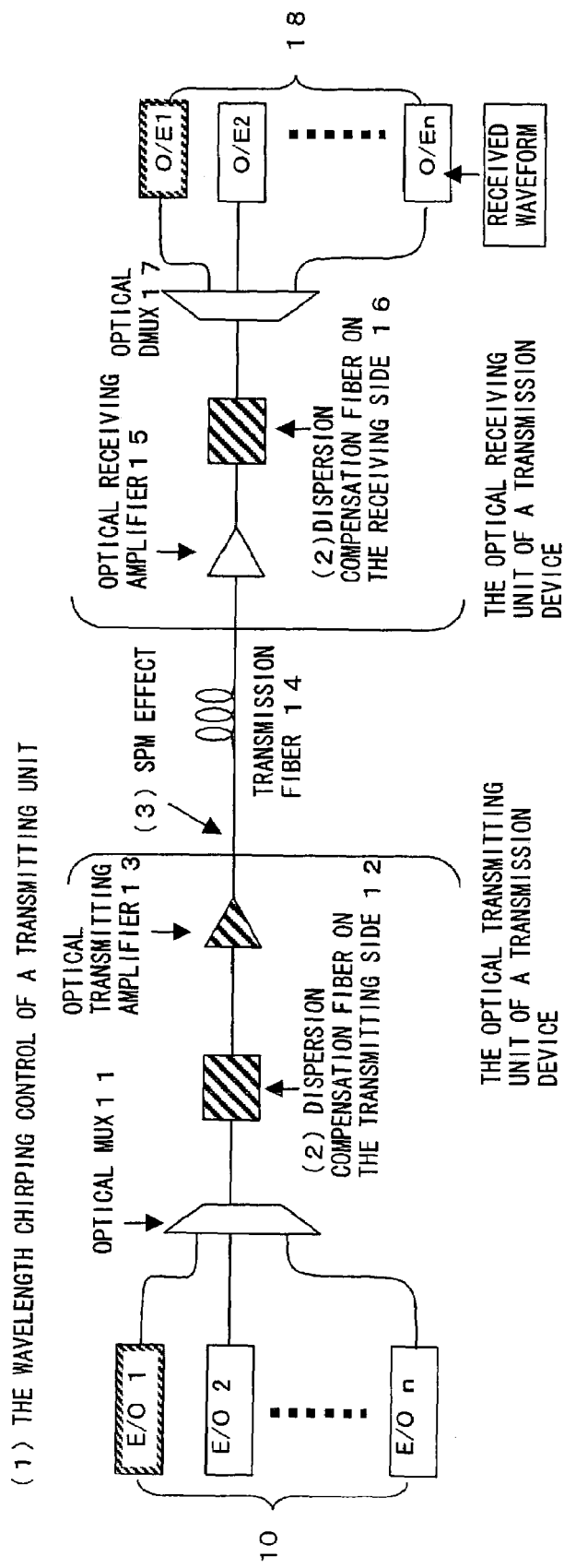
FIG. 1 shows the outline of a long-haul WDM system and a dispersion compensation method.
Figure 2:
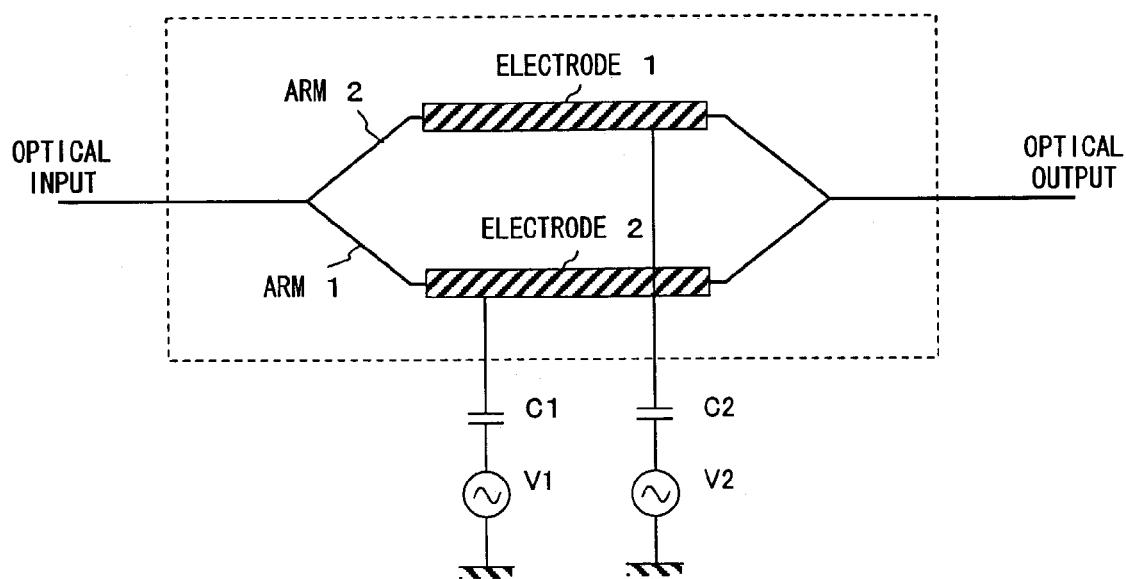
FIG. 2 shows the basic configuration of a Mach-Zehnder optical modulator and its operation (No. 1)
Figure 3:
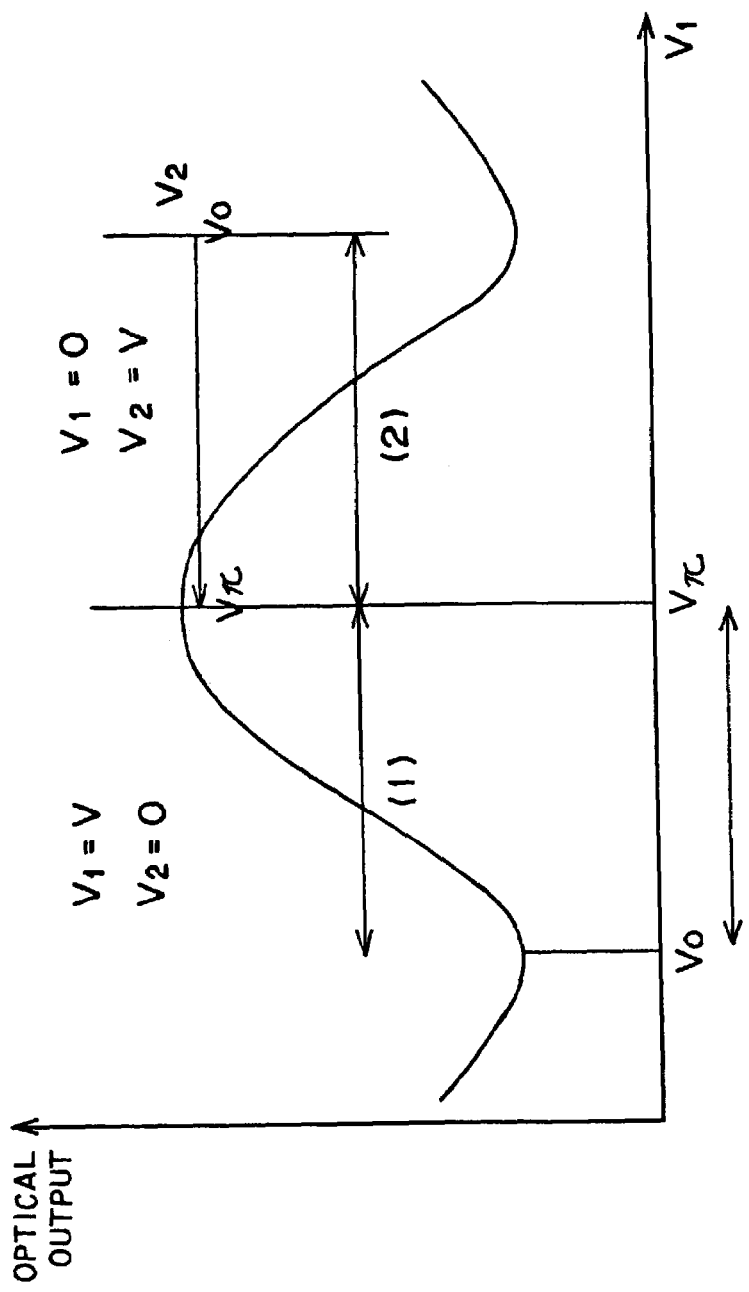
FIG. 3 shows the basic configuration of a Mach-Zehnder optical modulator and its operation (No. 2)
Figure 4:
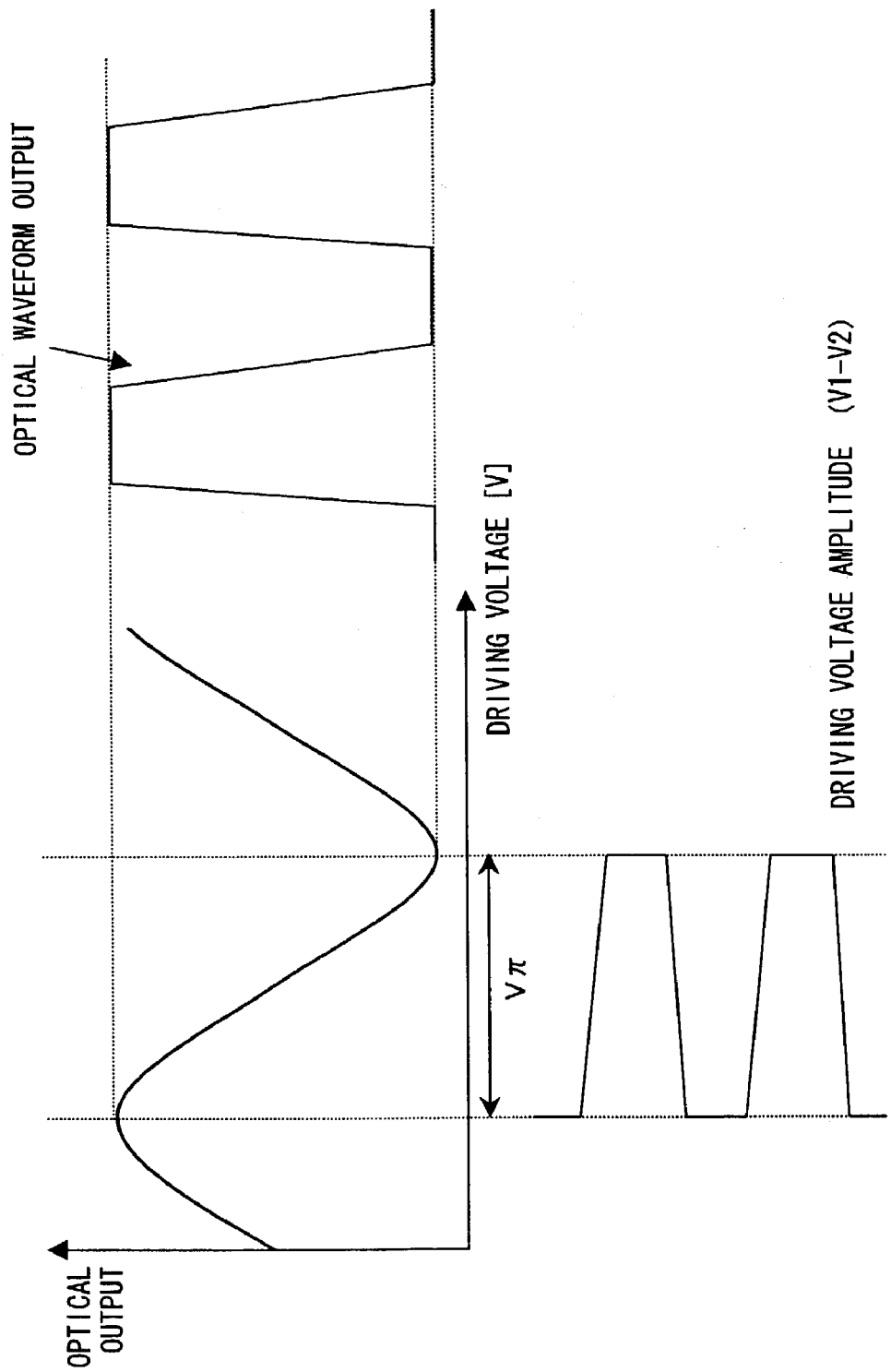
FIG. 4 shows the basic configuration of a Mach-Zehnder optical modulator and its operation (No. 3)
Figure 5:
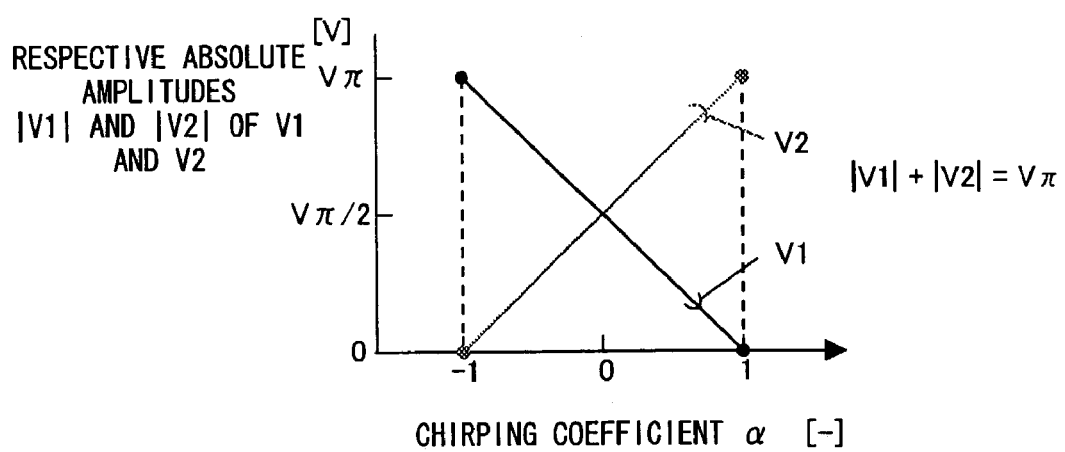
FIG. 5 shows the basic configuration of a Mach-Zehnder optical modulator and its operation (No. 4)

The means for controlling a driving voltage comprises a comparator circuit (driving voltage control circuit 24) for comparing the sign and magnitude of chirping that is detected by the detection unit 23, with a target chirping characteristic and for detecting the amount of deviation; and a driving voltage generation circuit 25 outputting the result as the amplitude control voltage of the driving circuit. The means for controlling a driving voltage provides the output for the driving amplitude of the Mach-Zehnder modulator, based on a signal from the driving voltage control circuit 24, as shown in FIG. 5.

Specifically, the driving voltage control circuit 24 compares a voltage representing the magnitude and sign of chirping from the detection unit 23 with a target chirping characteristic settings voltage, and inputs the difference between the relevant voltage and the target voltage to the driving voltage generation circuit 25. The driving voltage generation circuit 25 determines voltages V1 and V2 to be applied to the electrodes of the Mach-Zehnder optical modulator 20 in such a way as to reduce the difference, based on this voltage difference, and applies them to the electrodes of the Mach-Zehnder optical modulator 20. Capacitors C1 and C2 are inserted between the driving voltage generation circuit 25 and each electrode of the Mach-Zehnder optical modulator to eliminate respective bias voltages.

Since the variance of the amount of chirping against the driving voltage of the Mach-Zehnder optical modulator 20 can be absorbed by detecting a wavelength chirping characteristic in an optical output waveform and since the target chirping characteristic can be accurately controlled, cost-reduction due to the improved yield of a Mach-Zehnder optical modulator and the improved transmission quality of an optical transmission system can be realized.

Figure 25:
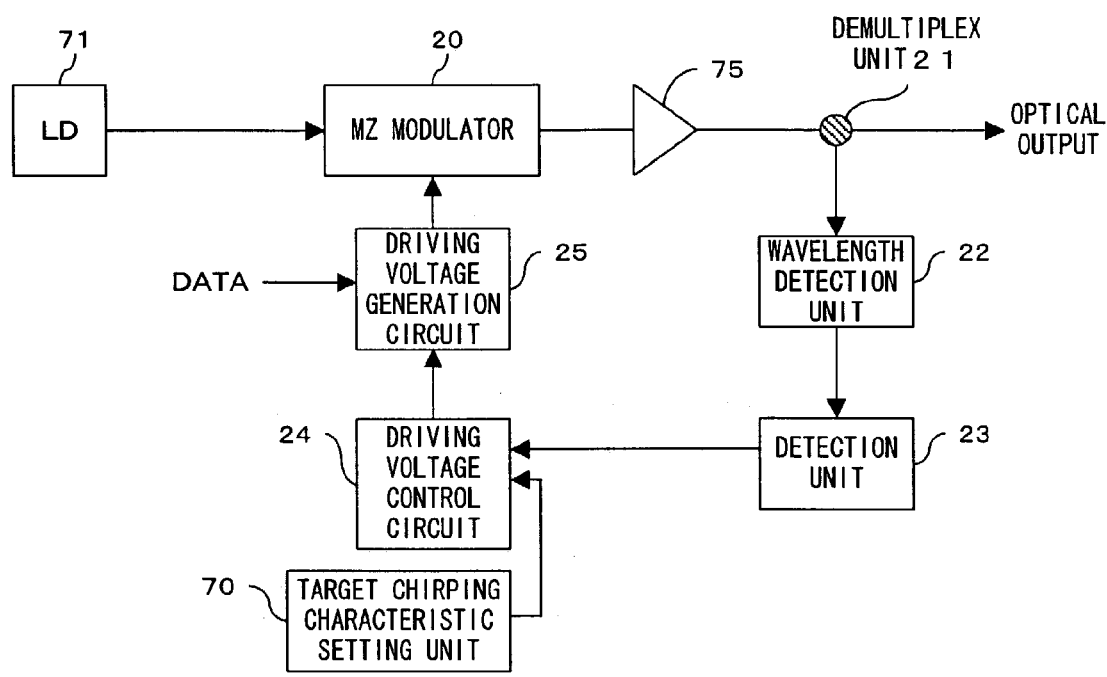
FIG. 25 shows the configuration of an optical transmitter according to the preferred embodiment of the present invention (No. 2).

FIGS. 24 and 25 show the configuration of an optical transmitter according to the preferred embodiment of the present invention. In FIGS. 24 and 25, the same reference numbers are attached to the same components as those described throughout this document.

In FIG. 24, the Mach-Zehnder optical modulator 20 modulates and outputs light emitted from an LD 71. A demultiplexer 21 demultiplexes the output of the Mach-Zehnder optical modulator 20. The wavelength detection unit 22 detects the wavelength component of the optical output waveform, and the detection unit 23 detects the sign and magnitude of chirping. The detected sign and magnitude of chirping are inputted to the driving voltage control circuit 24 and are compared with the target chirping characteristic settings voltage of a target chirping characteristic setting unit 70. By controlling the voltage control circuit 24 to control the driving voltage of the Mach-Zehnder optical modulator 20, and based on the result of this comparison and the data signal, the driving voltage amplitude ratio of the Mach-Zehnder optical modulator 20 is controlled in such a way that the detected chirping characteristic matches the target value set in the system.

In FIG. 25, an optical amplifier 75 is connected to the output of the Mach-Zehnder optical modulator 20. The wavelength detection unit 22 demultiplexes the output of the optical amplifier 75 and detects the wavelength component of the optical output waveform. Then, the detection unit 23 detects the sign and magnitude of chirping. Then, the driving voltage amplitude ratio of the Mach-Zehnder optical modulator 20 is controlled in such a way that the detected chirping characteristic matches the target value set in the system, in the same way as shown in FIG. 24.

By directly measuring the magnitude of chirping and the like, based on an optical signal, which is the output of an optical modulator, the stable (also variable) control of the magnitude of chirping can be accurately exercised, and accordingly long-haul transmission and cost reduction due to the menu reduction of a dispersion fiber can be realized in an optical communication system.

What is claimed is:

1. An optical transmitting device, comprising:
    an optical modulation unit modulating an input optical signal, based on an input voltage;
    a first detection unit detecting a wavelength change included in an output of the optical modulation unit;
    a second detection unit detecting the magnitude and sign of chirping included in an output of the optical modulation unit from an output of the first detection unit; and
    a control unit controlling the input voltage provided to the optical modulation unit, based on the result of detection of the second detection unit.

2. The optical transmitting device according to claim 1, wherein said first detection unit further comprises a wavelength filter unit in which a wavelength transmission characteristic of an input optical signal is linear.

3. The optical transmitting device according to claim 2, wherein said first detection unit further comprises means for outputting a difference between an output of said wavelength filter and an output of said optical modulator unit.

4. The optical transmitting device according to claim 1, said first detection unit further comprising:
    a first wavelength filter unit in which a wavelength transmission characteristic of an input optical signal is positive and linear against a wavelength; and a second wavelength filter unit in which a wavelength transmission characteristic of an input optical signal is negative and linear against a wavelength.

5. The optical transmitting device according to claim 1, wherein said control unit controls the input voltage in such a way that the magnitude and sign of chirping that are detected by the second detection unit approaches a set reference chirping characteristic.

6. The optical transmitting device according to claim 1, wherein said second detection unit detects the sign and magnitude of chirping in a peak value of a signal voltage indicating optical intensity of said first detection unit.

7. The optical transmitting device according to claim 1, wherein said second detection unit samples an output of said first detection unit and detects the sign and magnitude of chirping by detecting the peak voltage of a digitized output of said first detection unit after digitizing the output of said first detection unit.

8. The optical transmitting device according to claim 7, wherein the sampling is conducted across a plurality of symbols of an optical output signal of said optical modulation unit.

9. The optical transmitting device according to claim 1, wherein said second detection unit extracts only a signal voltage indicating optical intensity of said first detection unit corresponding to only an ascending or descending part of an optical output signal of said optical modulation unit.

10. The optical transmitting device according to claim 1, wherein said control unit compares the sign and magnitude of chirping detected by said second detection unit with a target sign and magnitude of chirping, and controls said optical modulation unit, based on these differences.

11. The optical transmitting device according to claim 1, further comprising an optical amplifier unit, wherein said first detection unit receives an output of the optical amplifier unit as an input.

12. The optical transmitting device according to claim 1, wherein said optical modulation unit is a Mach-Zehnder optical modulator.

13. A method of transmitting optical signals, comprising:

modulating an input optical signal, based on an input voltage;

detecting a wavelength change included in an output of the modulated optical signal;

detecting the magnitude and sign of chirping included in an output of the modulated optical signal from an output of the detected wavelength change; and controlling the input voltage based on the result of the detection of the magnitude and sign of chirping.

* * * * *